Dec. 11, 1934.  A. GRECO  1,984,064
PACKAGING APPARATUS
Filed April 18, 1932  2 Sheets-Sheet 1
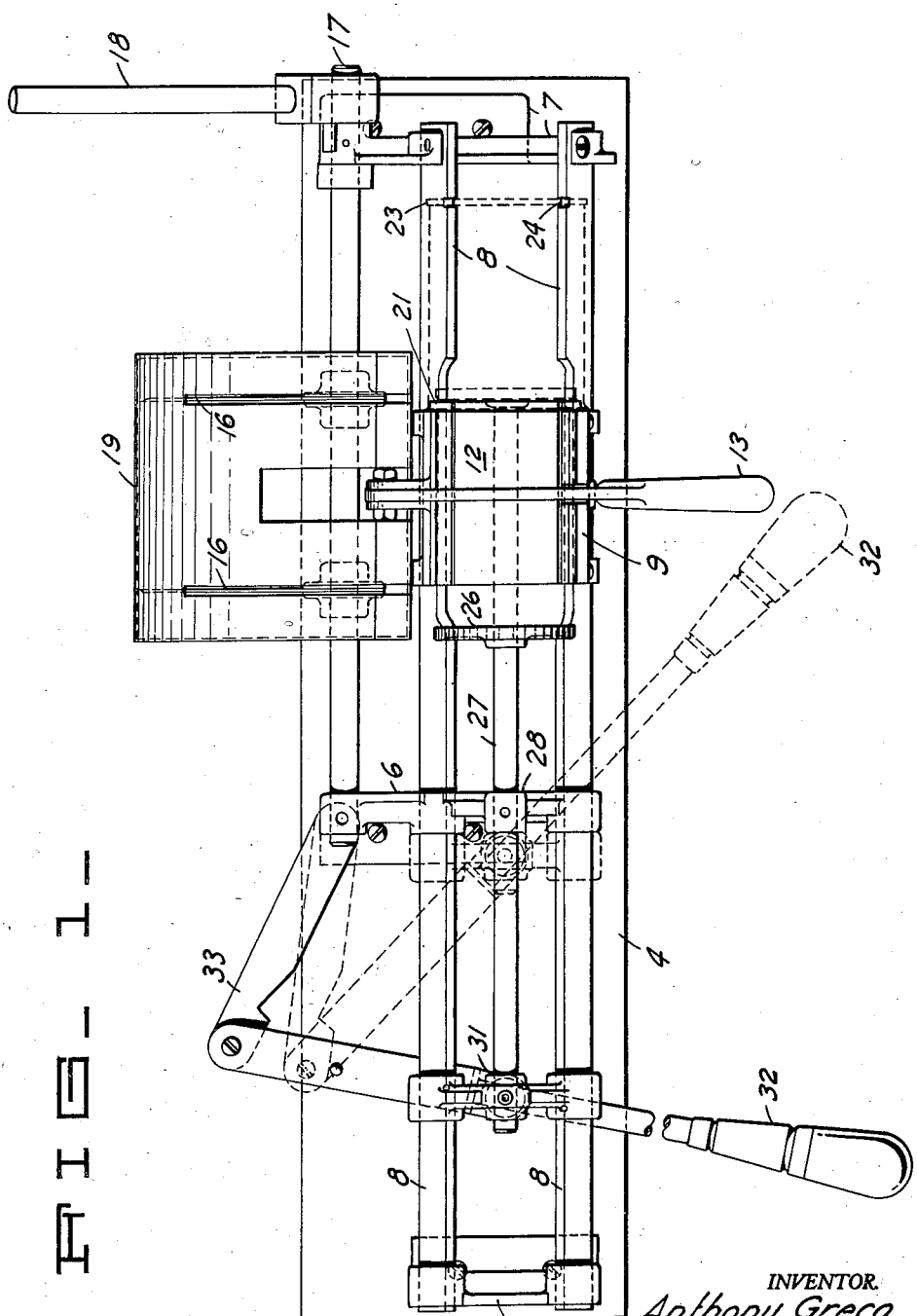
INVENTOR.
Anthony Greco.
BY Charles M Fryer
ATTORNEY.

Dec. 11, 1934.  A. GRECO  1,984,064
PACKAGING APPARATUS
Filed April 18, 1932   2 Sheets-Sheet 2
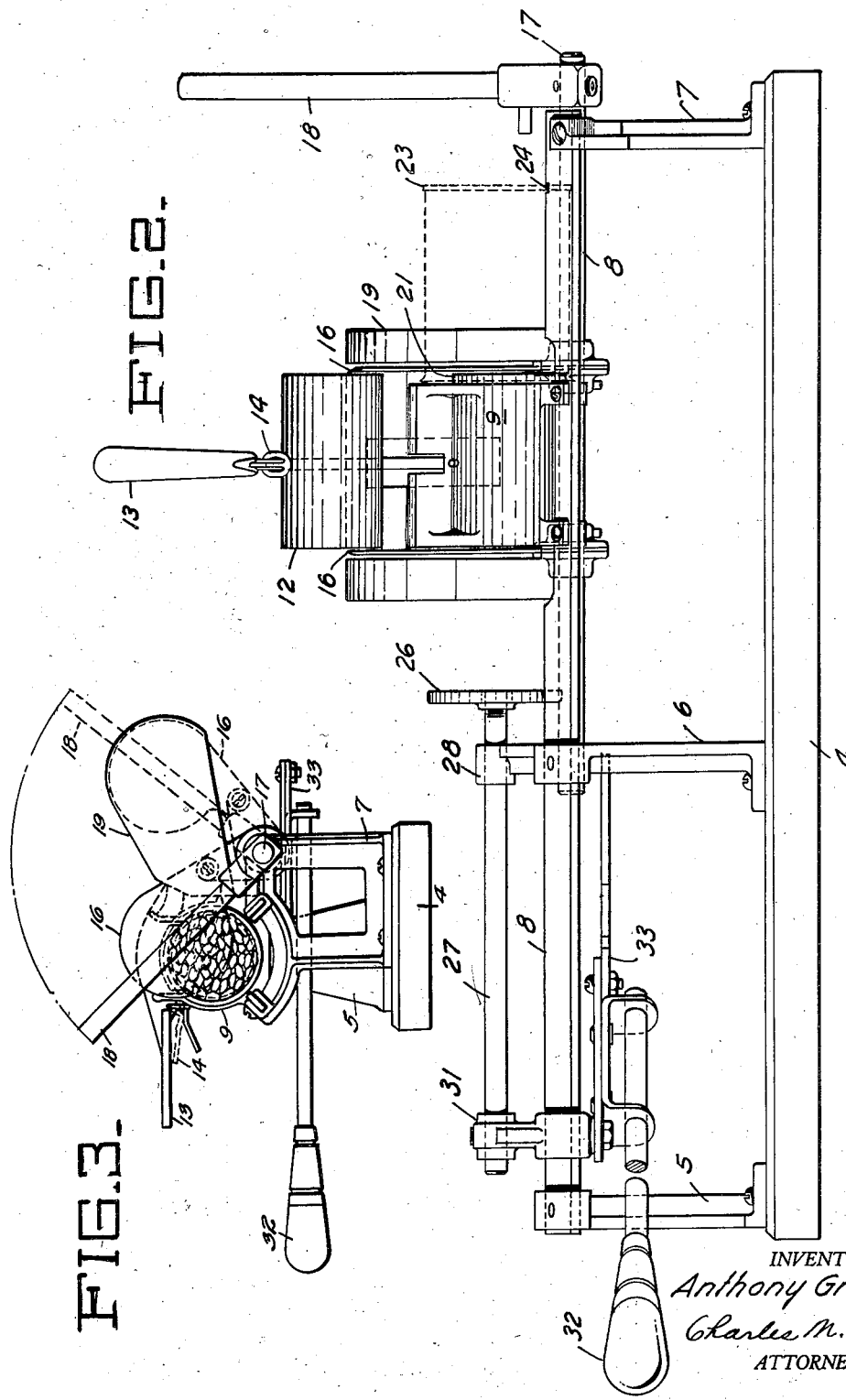
INVENTOR.
Anthony Greco.
Charles M. Fryer
ATTORNEY.

Patented Dec. 11, 1934

1,984,064

UNITED STATES PATENT OFFICE 1,984,064

PACKAGING APPARATUS

Anthony Greco, Santa Clara, Calif.

Application April 18, 1932, Serial No. 605,943

10 Claims. (Cl. 226—101)

This invention relates to an apparatus for packing a body of material into a receptacle and particularly one for molding a bunch of loose material, into a body having a desired configuration, which body is subsequently displaced into a positioned receptacle.

In my Patent 1,235,680, dated August 7, 1917, is disclosed a mold which has been successfully used in the canning of vegetables such as string beans; and the apparatus of my present invention employs a mold of the same general character. I shall preferably describe the packing apparatus of my invention in operation upon string beans in forming the known "asparagus pack" string beans. It is to be understood, however, that the apparatus is suited to the handling and canning of other materials such as asparagus.

As is disclosed in my aforementioned patent, when operating or processing beans, the strings are first removed from the beans and thereafter the beans are blanched for approximately two minutes. The beans are then in a soft pliable condition and, when placed in bunch formation within a suitable mold, the beans form a solid pack with their ends projecting beyond the mold. These ends are cut off flush with the mold so as to secure uniformity of length of the beans.

The mold disclosed in my patent molded the beans into bunch formation and held them so that they could be displaced into a receptacle, such as a tin can by jarring the mold. The inertia of the beans would cause them to pass into the receptacle. The beans were thus neatly and attractively deposited within the can, being of a uniform length.

With my previous device, the various operations recited were separate hand operations. Thus it was necessary for an operator to grasp the mold in one hand while inserting beans with the other hand. The cutting off of the ends of the beans was by means of a separate knife which the operator held to cut off the ends of the beans. The displacement of the beans into the can was likewise a separate hand operation, it being necessary for the operator to hold the can in position and at the same time raise the mold and can together. The necessity for an operator having to hold the mold while inserting the beans, or while using the knife, or having to hold the mold and can together while displacing the beans into the can, all made for the packing and canning operation being comparatively slow. By means of the apparatus of the present invention, practically all of these various hand operations are eliminated; so that an operator is required to perform manually only those operations which are necessary to the packaging, as the furnishing of beans for molding into the bunch, or the positioning of a receptacle to receive the molded beans.

It is, therefore, the broad object of the present invention to devise a suitable apparatus for facilitating the formation of a loose bunch of material into a molded form, which can be subsequently substantially automatically displaced into a positioned receptacle.

Another object of the invention is the provision of apparatus, of the character described, which is manufactured as a complete article of manufacture.

A further object of the invention is the provision of the described apparatus, which is of simple and inexpensive construction, and which, therefore, can be economically manufactured.

An additional object of the invention is the provision of a comparatively light, compact and portable apparatus, which can be readily carried about from place to place as the occasion demands.

The invention possesses numerous other advantageous features and objects, some of which, with the foregoing, will appear at length in the following specification wherein I have outlined the preferred form of the apparatus of my invention. It is to be understood that this form is merely that form which is the preferred one and which has been successfully used in the packaging and canning of string beans.

In the drawings, Figure 1 is a plan view of a form of apparatus of my invention.

Figure 2 is a side elevation of the apparatus shown in Figure 1.

Figure 3 is an end elevation of the apparatus shown in Figure 1.

Briefly characterized, the apparatus of my invention can be considered, from one aspect, as comprising means for molding a bunch of material into a suitable form, means associated with the molding means for positioning a receptacle into which the molded material is to be passed, and means for effecting passage of the material from the mold into the receptacle. Also, the apparatus is usually provided with means for trimming the material projecting through the ends of the mold.

In the preferred form of apparatus as disclosed I have provided a base 4 upon which several upright members 5, 6 and 7 are secured. These members carry spaced straps 8 which provide a suitable unitary bed or frame for units of the device, as will presently appear.

Means are provided for receiving the loose material, such as the string beans, and for molding this loose material into a form suitable for displacement into a receptacle such as a can. The mold is preferably of a flexible character, so that it can be readily opened, and the material to be molded can be readily placed therein and molded. Thus, in the drawings, I have shown a tubular mold, which is cylindrical in shape, as comprising two coacting portions, one of which portions 9 is fixed upon the bed provided by the straps 8 and is positioned between the straps. The other or upper portion 12 is carried upon a hinged handle 13, and is adapted to be locked into place by any suitable locking means 14 to complete the tube or cylinder and so compress and mold the beans or other material to be transferred from the mold into the receptacle.

Since it is desirable, when packing string beans, that the beans be of substantially uniform length, I provide means for cutting off and trimming the beans which extend through the open ends of the mold. These means comprise knife members 16, which are positioned in material severing relationship closely adjacent the ends of the mold. The knife members are fixed to shaft 17, mounted for limited rotational movement on the upright members 6 and 7, and extend transversely of the shaft. A handle 18 is attached to the shaft 17 and is adapted to be grasped for effecting movement of the knife members 16 past the ends of the mold, from a position within the knife guard 19 as is shown in Figure 3. During this movement, the ends of material extending from the mold, as the beans, are cut off; and the beans left in the mold are all of a substantially uniform length. The material which is cut off can fall through the opening formed between the straps 8, thus avoiding clogging of the apparatus by the cut off material. If desired, a container may be removably positioned below the mold and on base 4 to catch the cut off material as it falls between the straps 8. It is to be observed that the knives 16 are secured to the apparatus and are enclosed by the guard 19, except when they are advanced to cut off the bean ends. This insures that the operator is protected against accidental contact with the knives. Furthermore, the handle 18 is remotely positioned from the knives; and this enables the knives to be controlled and operated without the operator's hand being brought close thereto while they are cutting.

Means are provided on the mold for positioning a receptacle, such as a can, to receive the body of material formed in the mold. This means preferably includes a flange 21 formed upon the mold on that side where the can is to be positioned so that, as is shown in Figure 1, the contents of the can can be readily displaced or transferred into the container.

Means are also provided on the frame for retaining a positioned can in such a manner that the contents of the mold can be readily displaced into the can, without the operator having to hold the can. This means, in the form of device shown in the drawings, has been simplified by taking advantage of the fact that the usual form of can in which beans are packed includes a flange 23. Notches 24 are formed in the straps 8, in which flange 23 is adapted to be received when the can is positioned over the flange 21 of the mold. The can is thus held at three places, upon the flange of the mold and by each of the notches 24.

After the extending ends of the material have been cut off by the knife blades and a can has been positioned upon the flange 21 and in the notches 24, the contents of the mold are preferably displaced into the fixedly positioned can. Accordingly, suitable means are provided which are adapted to be moved into the mold and relative thereto to force out the mass of beans in a body. This means includes a piston or plunger member 26 carried upon a movable rod 27. The rod is supported for a sliding movement in a bearing 28 carried on upright member 6. The other end of the rod is mounted in a carriage 31 slidable over the frame provided by the straps 8; and the rod can be moved by a handle 32 and lever mechanism indicated as 33. The piston member 26 is of such a size that it practically fills the mold simultaneously to engage and to displace therefrom, upon relative displacement movement, all of the beans, or other material, from the mold into the can. The movement of the piston member relative to the mold is accomplished by operating handle 32, the piston member 26 being moved between the full line position shown in Figure 1 to the dotted line position in which the molded bunch of beans is displaced into the can.

In operation, the handle 13 is lifted upwardly to carry the portion 12 of the mold away from the remaining portion of the mold and allow beans to be readily inserted into the mold. Since the operator does not have to hold the mold, this operation can be performed very rapidly because both hands can be used for filling the mold with beans. As soon as the mold is practically full of beans, the operator depresses the handle and completes the mold by locking the portion 12 by the locking means 14. A pull on the handle 18 brings the knife means 16 from out of the guard and over the ends of the mold, to sever the beans so as to be of substantially uniform length. As the knives are being returned to their position within the guard, the operator can place a can in position to receive the contents of the mold. When the can is placed, a pull on the handle 32 will move the piston means relative to the mold and thus bring about the discharge of the contents of the mold into the can; so that the contents of the mold are uniformly and quickly moved into the can. After this, the can is removed, the mold reopened and the operation continued.

From the foregoing I believe that it will be apparent that I have devised a novel and a useful apparatus which will facilitate the packing of a material as string beans into a suitable receptacle. The apparatus is composed of few and simple parts, is light, and is therefore readily transportable from place to place. While it will be apparent to those skilled in the art that various modifications of this apparatus are possible, it is within the contemplation of my invention that such modifications will be made, and it is my intent that the claims will cover such modifications, within the limits established by the prior art.

I claim:

1. In a device for canning beans or the like, a frame, a tubular mold fixed to said frame, said mold comprising a plurality of relatively movable sections, a plunger mounted for movement into the mold for forcing material therefrom into a receptacle positioned adjacent the mold, and a receptacle positioning flange formed on the sections of said mold.

2. In a device for canning beans or the like, a frame, a tubular mold fixed to said frame, said mold comprising a plurality of relatively movable sections, a plunger mounted for movement into the mold for forcing material therefrom into a receptacle positioned adjacent the mold, a receptacle positioning flange formed on the sections of said mold, and means on the frame for holding the receptacle in position.

3. In a packaging device, a frame including a plurality of spaced straps, a tubular mold fixedly positioned between said straps, means for trimming material extending beyond the ends of said mold, and means for forcing material from said mold into a receptacle positioned adjacent the mold.

4. In a device for canning beans or the like, a frame, a tubular mold comprising relatively movable sections mounted on said frame and adapted to mold material in a solid body, can positioning means on said frame and on said mold for fixedly but removably holding a can adjacent an end of said mold, material trimming means adjacent an end of the mold, and a slidable plunger adapted to force material from the mold into said can.

5. In a packaging device, a frame, a tubular mold mounted on said frame, a plunger mounted for movement relative to the mold for forcing material therefrom into a can having a flange, and means on said frame adapted to engage said flange for holding the can adjacent an end of the mold.

6. In a packaging device, a frame, a mold mounted on said frame, and a plunger mounted for movement relative to the mold for forcing material therefrom into a can having a peripheral flange, said frame being provided with recessed means to engage said flange for positioning the can adjacent an end of the mold.

7. In a packaging device, a frame including spaced members forming an opening therebetween, a tubular mold fixedly positioned between said members, means for trimming material extending beyond an end of said mold, and means for forcing material from said mold into a receptacle positioned adjacent the mold.

8. In a device for canning beans or the like, a frame, a tubular mold mounted on said frame, can positioning means on said frame and on said mold for fixedly but removably holding a can adjacent an end of said mold, material trimming means adjacent an end of the mold, and means for transferring material from the mold into said can.

9. In a device for canning beans or the like, a frame, a tubular mold comprising relatively movable sections, means for immovably securing one of said sections on said frame, can positioning means on said frame and on said mold for fixedly but removably holding a can adjacent an end of said mold, movable material trimming means adjacent an end of the mold, and means for transferring material from the mold into said can.

10. In a packaging device, a frame, a tubular mold mounted on said frame, means for transferring material from the mold into a can having a flange, and means on said frame adapted to engage said flange for holding the can adjacent an end of the mold.

ANTHONY GRECO.